Patented Mar. 14, 1944

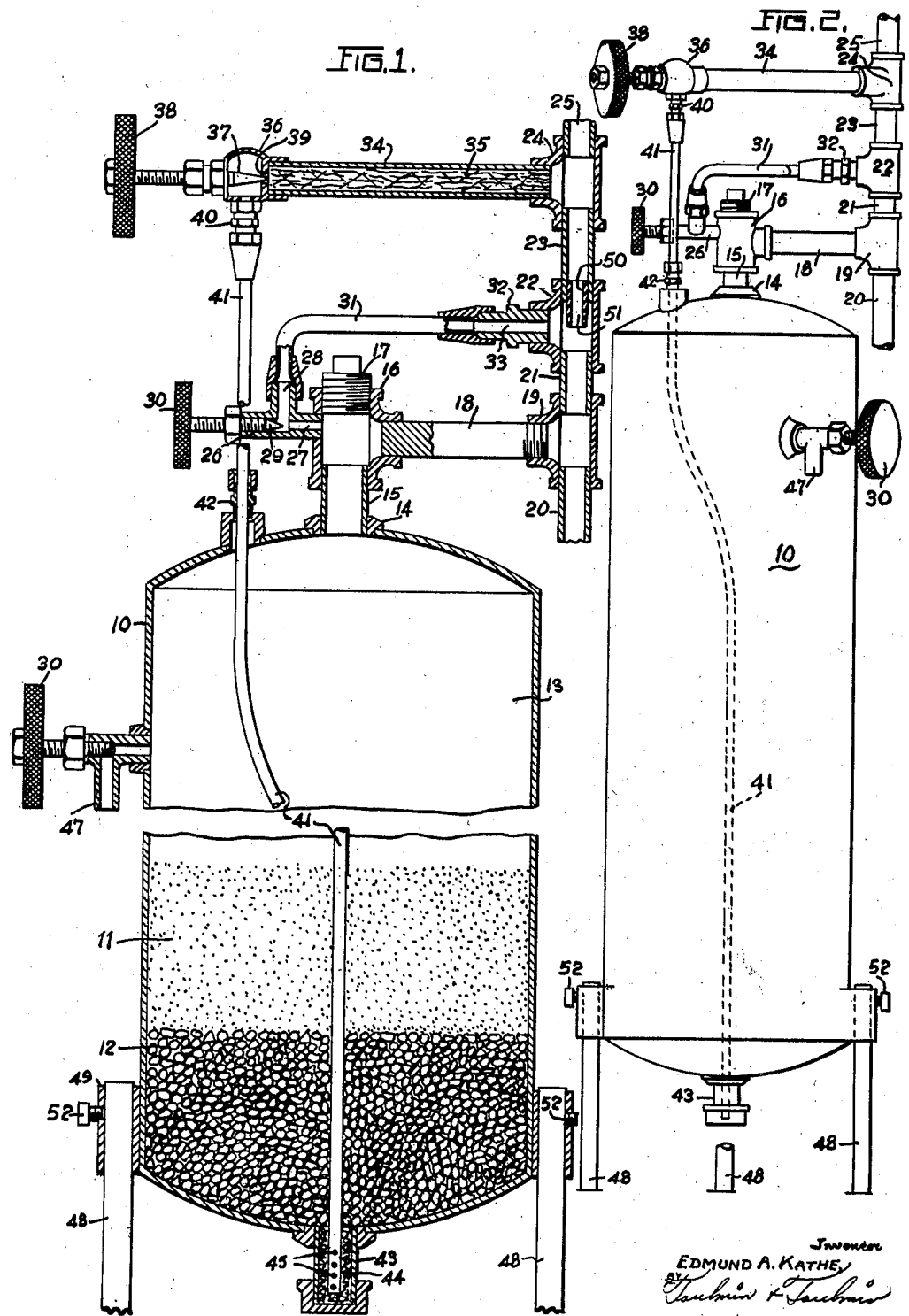

2,344,251

UNITED STATES PATENT OFFICE 2,344,251

WATER SOFTENING SYSTEM

Edmund A. Kathe, Springfield, Ohio, assignor to The Rainflo Manufacturing Company, Springfield, Ohio, a corporation of Ohio Application August 21, 1941, Serial No. 407,753

4 Claims. (Cl. 210—31)

This invention relates to a system and apparatus for softening water.

An object of the invention is to provide a system for softening water wherein a portion of the water flowing through the service line is by-passed through a chemical tank for supplying chemical to the water in the service line.

Another object of the invention is to provide a system for softening water wherein a by-pass circulating system is associated with the main service line and adapted to receive water from the service line to direct a flow of water softening fluid into the service line.

Another object of the invention is to provide a water softening system in accordance with the foregoing objects wherein the water flow through the by-pass system is proportioned to the water flow through the service line to thereby regulate the quantity of water softening agent directed into the service line.

It is another object of the invention to provide a water softening system wherein a by-pass circulating system is provided for causing a flow of a water softening agent into the service line and an ejector is provided in parallel circuit relationship with the by-pass system.

Another object of the invention is to provide a water softening system wherein a portion of the water flowing through the service line is directed into a chemical tank for dissolving a chemical agent therein and supplying the liquid chemical agent to the service line for dispersing water hardness, and an ejector is provided for cooperating with the by-pass circulating system to produce a pressure differential for causing flow through the by-pass circulating system.

Another object of the invention is to provide a water softening system wherein the combination of a by-pass water circulating system and an ejector produces a positive flow of a liquid water softening agent into the water to be softened.

Another object of the invention is to provide a water softening system wherein a saturated solution of a water softening agent is directed into the water to be softened by means of a by-pass water circulating system associated with the service line and an ejector positioned in the service line and associated with the by-pass water system.

Another object of the invention is to provide a water softening system in accordance with the foregoing object wherein control means are provided for regulating the quantity of water circulating through the by-pass system and thus the quantity of chemical solution admitted to the water to be softened as drawn thereinto by means of the ejector.

Another object of the invention is to provide a simplified and positive proportioning control apparatus for regulating the proportion of a water softening agent admitted into a water stream for softening the same.

Another object of the invention is to provide a water softening apparatus of the liquid chemical type having a by-pass circulating system for controlling the quantity of chemical discharged into the water circulating system.

It is another object of the invention to provide a water softening apparatus in accordance with the foregoing objects wherein the by-pass system and control elements therein are produced as a unit adapted to be inserted within a service line.

Another object of the invention is to provide a water softening apparatus wherein a tank filled with water softening chemical supports a by-pass water circulating system for discharging the chemical from the tank into the main water system and the controls for the by-pass system.

Further objects and advantages will become apparent from the following description and the drawing.

In the drawing:

Figure 1 is a vertical cross-sectional view of the water softening apparatus of this invention.

Figure 2 is an elevational view of the water softening apparatus showing the manner in which the by-pass circulating system, ejector and the controls for the same are carried by the chemical tank.

In this invention the water softening apparatus consists of a tank 10 in which there is adapted to be placed a water softening agent 11 which is supported upon a bed of gravel, fine stone or grit 12. The water softening agent 11 is of a type which can be poured into the tank 10 in either a powdered or granular form and which is dissolved by water passing through the tank 10 to form a saturated chemical solution stored within the upper portion 13 of the tank 10. The saturated chemical solution is directed into the body of water to be softened for dispersing the hardness in the water. A suitable chemical agent such as tetrasodiumpyrophosphate is used and is well adapted to disperse the hardness in water.

The chemical tank 10 is provided with an opening in the top wall thereof in which there is secured a boss 14 adapted to receive a threaded nipple 15. A T-fitting 16 is threaded upon the nipple 15 and has a plug 17 secured in one end thereof. The vertical leg of the T-fitting 16 receives a plug 18 which is adapted to be threaded therein and extends a substantial distance from the T-fitting 16 for supporting a T-fitting 19 which is threaded upon the opposite end of the plug 18.

One side of the T-fitting 19 is connected to a house service line 20 while the opposite end thereof receives a nipple 21 upon which there is threaded a T-fitting 22. The T-fitting 22 receives a nipple 23 upon which there is secured a T-fitting 24 which has one opening thereof connected to a water supply line 25. The T-fittings 19, 22 and 24 and their interconnecting nipples 21 and 23 provide a through connection for the flow of water from the supply line 25 to the service line 20.

In order to soften the water passing from the supply line 25 to the service line 20 the saturated chemical solution in the tank 10 is directed through the T-fitting 22 into the water flowing from the supply line 25 to the service line 20. The T-fitting 16, carried upon the tank 10, is provided with a needle valve 26 having an opening 27 in communication with the interior of the fitting 16 and thus with the tank 10. A discharge passage 28 is provided in the valve 26 and is in communication with the inlet opening 27. A needle valve 29 is provided between the inlet passage 27 and the discharge passage 28 for closing the passage under conditions which will be hereinafter disclosed. A hand wheel 30 controls the movement of the needle valve 29. The discharge passage 28 of the valve 26 is connected by means of a conduit 31 to a fitting 32 which is in threaded engagement with the T-fitting 22. The fitting 32 has a passage 33 therein to permit flow communication between the conduit 31 and the interior of the T-fitting 22.

In order to supply water to the chemical tank 10 for dissolving the chemical 11 the T-fitting 24 supports a tube 34 which is filled with a filter material 35, such as steel wool or the like. A valve 36 is supported upon the projecting end of the tube 34 and is provided with a needle valve 37 operated by means of the hand wheel 38 for regulating the inlet passage 39 therein. The valve 36 is provided with a connecting fitting 40 through which water is discharged from the valve. The fitting 40 is connected to a conduit 41 which is extended into the tank 10 and adjacent the bottom thereof. The conduit 41 enters the tank 10 through a suitable sealing connection 42.

The lower end of the conduit 41 extending into the tank 10 is positioned within a well 43 secured to the bottom wall of the tank 10. The well 43 is filled with a filter material 44, such as steel wool or the like. The end of the pipe 41 positioned within the well 43 is provided with holes 45 through which the water discharges into the well 43 and thus enters the interior of the tank 10.

To provide a flow of water through the flow circuit consisting of the tube 34, the conduit 41, the tank 10 and the conduit 31 a pressure differential is established between the inlet of the tube 34 and the outlet of the conduit 31 by means of a fixed orifice or ejector 50 secured within the nipple 23. The orifice 50 has a passage 51 which is of less diameter than the diameter of the flow passage connecting the supply line 25 with the service line 20 so that the pressure between the supply line 25 and the orifice 50 is greater than the pressure between the orifice 50 and the service line 20. With the orifice 50 positioned in the supply line between the points of connection of the tube 34 and the conduit 31 with the supply line a pressure differential is established between these two points so that water from the supply line 25 will flow through the tube 34, the conduit 41, the tank 10 and the conduit 31 to the service line 20 thus establishing a by-pass circuit for a portion of the water flowing from the supply line 25 to the service line 20 through the orifice 50.

The orifice 50, in addition to providing means for establishing a pressure differential between the supply line 25 and the service line 20 also operates as an ejector to produce a low pressure area adjacent the passage 33 and within the interior of the T-fitting 22. The function of the orifice 50 as an ejector provides an apparatus for drawing liquid from the tank 10 through the conduit 31 for admission into the service line 20 by means of a suction. The ejector or orifice 50 provides a means for establishing a positive low pressure area within the T-fitting 22 for withdrawing the liquid from the tank 10, but the reduced pressure is not depended upon as the sole means for controlling the quantity of chemical withdrawn from the tank 10.

The needle valve 37 of the valve 36 is positioned with respect to the inlet orifice 39 in the valve 36 to control the quantity of water which is by-passed through the circuit consisting of the tube 34, the conduit 41, the tank 10 and the conduit 31. The inlet orifice 39 is opened sufficiently to control the proper flow of chemical from the tank 10 in accordance with the hardness of the water which is flowing through the service line 20.

The ejector or orifice 50 cannot withdraw more fluid from the tank 10 than is supplied thereto by the control valve 36 since the successful withdrawal of fluid from the tank 10 by the ejector 50 depends upon the complete filling of the tank 10. If the liquid level of the tank 10 should fall sufficiently low that liquid is not present in the conduit 31 or the passage 33 the ejector or orifice 50 could not withdraw liquid from the tank 10 since it would be working against a vacuum. Therefore, the control valve 36 gauges or regulates the quantity of water by-passed through the tank 10 and thus the quantity of water softening agent which is discharged from the tank 10 and drawn into the service line 20 by means of the ejector or orifice 50.

In order to start the water softener in operation after it has been suitably connected to the supply line 25 and the service line 20 a quantity of water softening agent must be supplied to the tank 10. To perform this operation the valves 26 and 36 are closed. The plug 17 is then removed from the T-fitting 16 and the valve 47, secured to the side wall of the tank 10, is opened to permit a quantity of the fluid within the tank 10 to drain therefrom. After the liquid in the tank 10 has stopped draining through the valve 47 it is then closed and a chemical water softening agent can be poured into the tank 10 through the T-fitting 16. The water softening agent being in the form of dry powder or granules will settle upon the gravel or grit bed 12 to form a bed of chemical 11. The plug 17 is then tightened in position in the fitting 16 and the valves 26 and 36 opened. The valve 26 is opened completely to provide a free passage between the inlet 27 and the outlet 28 thereof, while the valve 36 is opened sufficiently to permit the proper quantity of water to by-pass through the tank 10. The setting of the needle 37 of the valve 36 is determined by the position of the hand wheel 38 which can be suitably calibrated for various degrees of opening of the valve 36 or suitable instructions can be forwarded with the water softening equipment to open the valve 36 a predetermined amount as determined by the hardness of the water which is to be softened by the apparatus.

As long as there is no flow of water from the supply line 25 to the service line 20 there is no circulation through the by-pass system. However, after the plug 17 has been inserted in the fitting 16 sufficient water will flow into the tank 10 through the by-pass circuit to fill the same. The solution in the upper portion 13 of the tank 10 will be a saturated chemical solution since the water therein will always be in contact with the chemical in the bed 11. The quantity of chemical absorbed or dissolved into the water circulated through the by-pass system will be just sufficient to saturate the fresh water which is admitted into the tank 10 and therefore the chemical in the bed 11 will be dissolved at a rate proportionate to the quantity of flow of water through the by-pass circuit. The by-pass water softening system herein described provides a very accurate control over the quantity of a liquid chemical agent which is added to water circulating through a service line for dispersing the hardness thereof since the ejector 50 provides a positive suction for withdrawing the saturated solution of the water softening agent from the tank 10 while the valve 36 provides a definite control over the quantity of staturated solution which is permitted to be withdrawn from the tank 10.

The apparatus of this invention is constructed and arranged as a single unit wherein the various elements comprising the by-pass system and the controls for the same are supported upon the chemical tank so that it is only necessary to make two connections to the water softener when connecting the same into a service line. Suitable legs 48 are adjustably positioned within the bosses 49 secured to the tank 10, the bolts 52 providing means for securing the legs 48 within the bosses 49.

Having thus fully described my invention, what I claim as new and desire to secure by Letters Patent is:

1. A water softening system comprising a main water flow conduit for conducting the full flow of water from a supply line to a service line, a by-pass conduit for by-passing a part of the main water flow through a tank containing a water softening agent including an inlet and an outlet conduit connected to said main flow conduit and tank means disposed between the inlet and outlet conduits for said by-pass conduit for receiving a water soluble softening agent that settles to the bottom of said tank means, said inlet conduit extending to the bottom of said tank and said outlet conduit connecting with the top of said tank, an ejector in said main flow conduit through which the full flow of the main conduit passes for causing a pressure differential to be produced within the main flow conduit between opposite ends of said by-pass conduit for causing flow of water under pressure through said inlet conduit of said by-pass circuit for circulating water upwardly through the water softening agent in the bottom of said tank to maintain a saturated solution of the softening agent in the top of said tank and for establishing a positive low pressure area in said main flow conduit at the discharge side of said outlet conduit of said by-pass conduit for withdrawing a saturated solution of water softening agent from the top of said tank, and means having a variable orifice in said by-pass conduit for regulating the quantity of water circulating through said inlet conduit of said by-pass conduit to control the quantity of solution removed from said tank by said ejector.

2. A self-contained water softening unit comprising a container adapted to set upon a support member and forming the support member for the unit and adapted to contain a water softening agent, a fitting secured to said container through which the water softening agent can be poured, means extending from said fitting supporting a main water flow conduit means to which a water supply line and a service line are adapted to be connected, a second conduit means having one end thereof connected to said first mentioned conduit means and the opposite end thereof extending within said tank adjacent the bottom thereof, a third conduit means having one end thereof connected to said first conduit means and the opposite end to said fitting whereby said second and third conduit means form a by-pass water flow circuit parallel with respect to said first mentioned conduit means and of which said container forms a part, ejector means carried within said first mentioned conduit means and positioned between the connections of said second and third conduit means to said first conduit means for producing a pressure differential between opposite ends of said first mentioned conduit means to cause water flow through said by-pass circuit, and means in said second mentioned conduit means to regulate the quantity of water flow therethrough.

3. A water softening apparatus comprising a container, a water soluble softening agent within said container that is heavier than water to settle in the bottom of said container, a well in the bottom of said container, a main water flow conduit adapted to be connected to a hard water supply line and a service line, means supporting said main conduit upon said container to thereby provide support for other conduits connected thereto, a second conduit connected to said main conduit and extending into said well for supplying water under pressure therein beneath the water softening agent in said container for filtering upwardly therethrough and producing a water softening solution in the top portion of said container, a third conduit connected between the top of said container and said main conduit, an ejector in said main conduit for withdrawing water softening solution from said third conduit for distribution in the water flowing through said main conduit, and valve means in said second conduit regulating the flow of water under pressure into said container and thus regulating the quantity of solution in said third conduit for distribution into said main conduit by said ejector.

4. A water softening apparatus comprising a tank, a well in the bottom wall of said tank, a grit bed in the bottom of said tank, a water soluble softening agent that is heavier than water disposed upon said grit bed, a fitting on said tank through which water softening agent is supplied to said tank, a main water flow conduit adapted to be connected to a hard water supply line and a service line, means extruding from said fitting supporting said main conduit and thereby providing means for supporting other conduits connected thereto, a second conduit connected to said main conduit and extending into said well having valve means therein for regulating the flow of water under pressure into said tank for filtering upwardly through said grit bed and said water softening agent to produce a water softening solution in the top of said tank, an ejector in said main conduit, a third conduit connecting between the top of said tank and said main conduit and having the discharge end thereof adjacent said ejector, said ejector withdrawing water softening solution from the top of said tank through said third conduit as permitted by the flow of water under pressure to said tank under control of said valve.

EDMUND A. KATHE.